(12) United States Patent
Huboi

(10) Patent No.: US 8,108,218 B1
(45) Date of Patent: Jan. 31, 2012

(54) METHODS AND APPARATUS FOR VOICE RECOGNITION FOR CALL TREATMENT MODIFICATION ON MESSAGING

(75) Inventor: Peter Allen Huboi, Aptos, CA (US)

(73) Assignee: Avaya Inc., Basking Ridge, NJ (US)

( * ) Notice: Subject to any disclaimer, the term of this patent is extended or adjusted under 35 U.S.C. 154(b) by 941 days.

(21) Appl. No.: 09/459,380

(22) Filed: Dec. 13, 1999

(51) Int. Cl.
*G10L 21/00* (2006.01)
(52) U.S. Cl. .................. 704/275; 704/251; 704/270
(58) Field of Classification Search .............. 704/275, 704/251, 271; 379/88.01, 88.04
See application file for complete search history.

(56) References Cited

U.S. PATENT DOCUMENTS

| | | | | |
|---|---|---|---|---|
| 4,982,420 A | * | 1/1991 | Theis | 379/68 |
| 5,553,119 A | * | 9/1996 | McAllister et al. | 379/88.01 |
| 5,625,748 A | * | 4/1997 | McDonough et al. | 704/251 |
| 6,064,963 A | * | 5/2000 | Gainsboro | 704/270 |
| 6,243,445 B1 | | 6/2001 | Begeja et al. | |
| 6,327,343 B1 | * | 12/2001 | Epstein et al. | 379/88.01 |

OTHER PUBLICATIONS

Sadaoki Furui, "Digital Speech Processing, Synthesis, and Recognition," Marcel Dekker, Inc., New York, 1989, pp. 225-289.*

* cited by examiner

*Primary Examiner* — Douglas Godbold
(74) *Attorney, Agent, or Firm* — Chapin IP Law, LLC; David W. Rouille

(57) ABSTRACT

Methods and systems for analyzing voice information to determine if specific words or phrases are used or if the voice information exhibits a particular pattern of speech. Depending on which words or phrases are determined to have been used, a specific action or actions is taken. The words or phrases along with the actions may be user specified. In one example, a voice message is analyzed to determine if it includes any of the specified words or phrases or whether it exhibits a particular pattern of speech. If so, a specified action, such as forwarding the voice message to a particular person, is performed. In another example, voice information from a called person is analyzed to gain information regarding the status of a call. This information may be used, for example, for generating call statistics or notifying a supervisor on the status of a call.

29 Claims, 6 Drawing Sheets

METHODS AND APPARATUS FOR VOICE RECOGNITION FOR CALL TREATMENT MODIFICATION ON MESSAGING

BACKGROUND OF THE INVENTION

The present invention relates generally to voice recognition, and more particularly, to analyzing voice information to determine call treatment.

In voice mail systems, callers leaving a message are typically directed to press numbers on their phone to perform various functions. For example, a caller may be able to press "0" to be directed to an operator, press "1" to mark a message as "Urgent", press "2" for standard delivery, or press "3" to mark a message private. This can be cumbersome for the caller, because the caller may not know which buttons to press or not want to take the time to find out. Thus, the caller may not mark messages or be directed to the proper person. For example, "Urgent" messages may not be marked as "Urgent" because marking the message is too cumbersome.

Further, in call processing centers, which may for example engage in telemarketing, supervisors may want to be informed of the call's status or other information regarding the call. However, at present, a call processing center supervisor is typically only informed of this information by either listening in on the call or by monitoring other data such as length of time transpired. A call processing center supervisor cannot listen to each and every call.

Accordingly, there is a need for analyzing voice information in order to determine call treatment.

SUMMARY OF THE INVENTION

Thus, it is desirable to have a method and system, which overcomes the above and other disadvantages of the prior art.

Methods and systems consistent with the present invention include methods and systems for processing a voice message. These methods and systems include storing one or more voice representations, wherein each voice representation corresponds to a word or phrase, and storing one or more actions, receiving a voice message, analyzing the voice message to determine if one or more of the stored one or more voice representations occur in the voice message, and performing one or more of the stored actions, if one or more of the one or more stored voice representations is found to occur in the voice message.

In another aspect, the invention includes methods and systems for analyzing voice information received from a called person. These methods and systems include storing one or more voice representations, where each voice representation corresponds to a word or phrase, storing one or more actions, receiving voice information from a called person analyzing the voice information from the called person to determine if one or more of the one or more stored voice representations occur in the voice information received from the called person, and performing one or more of the stored one or more actions if the voice information is found to include one or more of the one or more voice representations.

In another aspect, the invention includes methods and systems for analyzing voice information received from a called person by looking for a particular pattern of speech. These methods and systems include storing one or more actions, receiving voice information from the called person, analyzing the voice information from the called person to determine if the voice information exhibits a particular pattern of speech, and performing one or more of the stored one or more actions if the voice information is found to exhibit the particular pattern of speech.

In yet another aspect, the invention includes methods and systems for processing a voice message by looking for a particular pattern of speech. These methods and systems include storing one or more actions, receiving a voice message, analyzing the voice message to determine if the voice message exhibits a particular pattern of speech, and performing one or more of the stored actions if the particular pattern of speech is found to occur in the voice message.

The summary of the invention and the following detailed description should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

DETAILED DESCRIPTION

Figure 1:
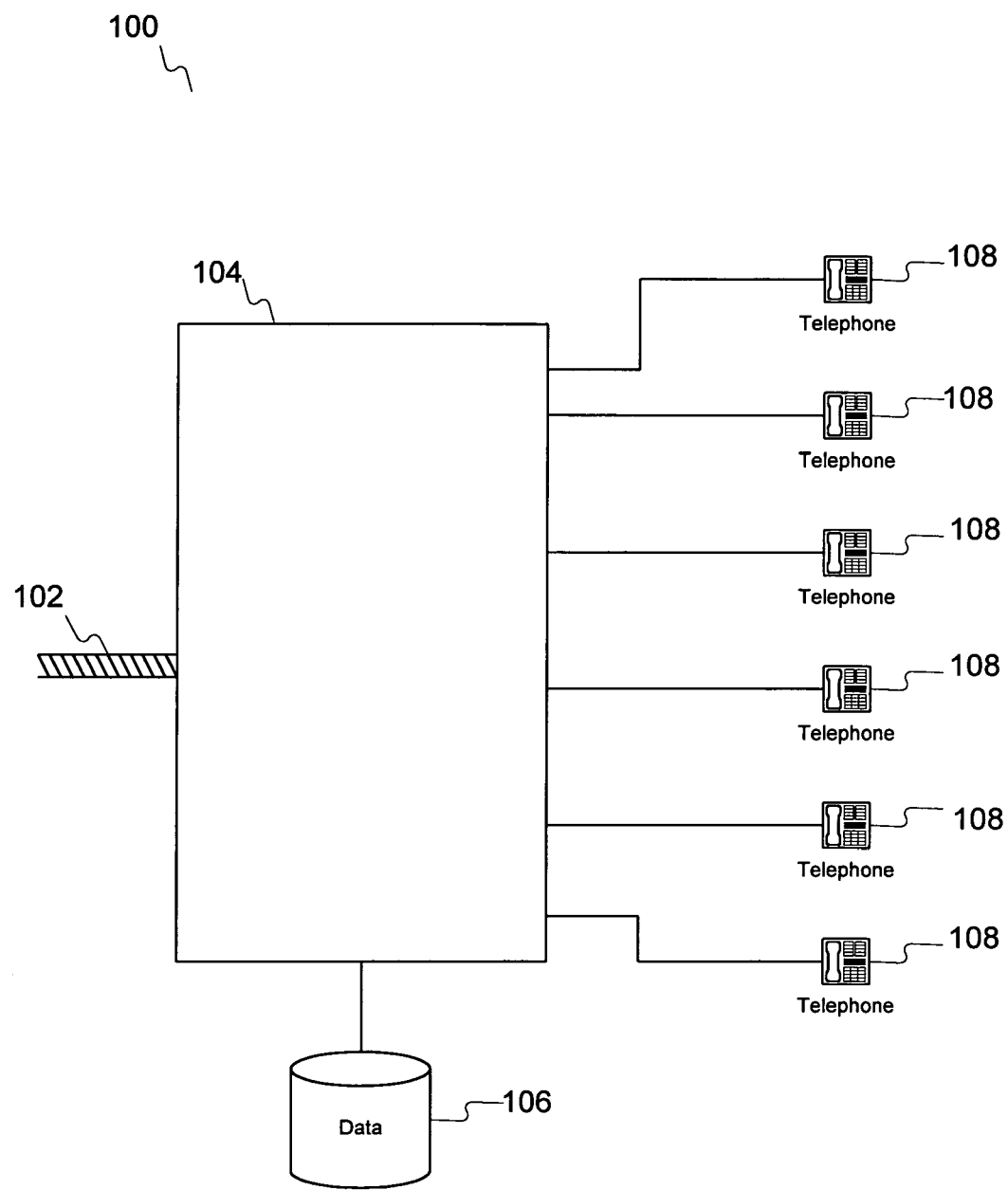
FIG. 1 provides a block diagram of a system for connecting telephone users with the public switched telephone network (PSTN), in accordance with methods and systems consistent with the invention.

Reference will now be made in detail to the preferred embodiments of the invention, examples of which are illustrated in the accompanying drawings. Wherever possible, the same reference numbers will be used throughout the drawings to refer to the same or like parts.

In an embodiment of the invention, a person's incoming voice information is examined to determine if specific words or phrases are used. Depending on which words or phrases are determined to have been used, a specific action or actions is or are taken. For example, if a user wants to be notified via pager of an urgent voice message, the words or phrases specified would be words or phrases indicative of a voice message being urgent. These words or phrases could include, for example, "urgent," "as soon as possible," "now", etc. Further, these words or phrases may be specified by the user. For example, if they want to be paged if a particular person calls, the user could specify that the incoming voice information be checked for this person's name(s) or nickname(s) (i.e., "John," "Doe," "JD"). The incoming message is then analyzed to determine if any of these specified words or phrases is used. If so, then specific action or actions may be taken, for example, paging the user. Further, depending on which of the specified words or phrases is used and/or the frequency of the words or phrases used, different actions may be taken. For example, if the voice information is determined to include only one use of the word "urgent" and no other specified words or phrases are used, the user may simply want the message to be marked as "urgent." However, if there are multiple uses of the specified words or phrases used or if a particular one or more of the specific words or phrases is used, the user may want the call to be redirected to a receptionist so that he/she can immediately direct the caller to a person who can immediately handle the call. For example, if the words "John" or "Doe" are found the user may want the call or message to be redirected to a receptionist.

In another embodiment, voice information is analyzed at a call processing center, which may be, for example, a call processing center for placing telemarketing calls to prospective customers. In this embodiment, voice information from prospective customers is analyzed in real-time in order to gauge how the call is going by looking for specific words or phrases that the prospective customer may use. For example, if the prospective customer uses words or phrases such as "Neat" or "Wow" the call may be judged as going well, while if the prospective customer uses words such as "Come on" or "Get real" the call may be judged as going poorly. This information then can be used to notify a supervisor or call agent of the status of a call. For example, if the call is judged as going well a green light could be turned on, while if the call is going poorly a red light could be turned on. The supervisor or call agent could then use this information to, for example, intervene in a call if it is going well so that they can close the sale, or alleviate a prospective customer's anger if the call is going poorly. Further, this information may be used to compile statistics on calls. For example, by analyzing voice information for specific words, statistics may be compiled on whether calls are going well or poorly for a specific call agent or script. The specific words or phrases searched for may be user specified.

In yet another embodiment, voice information is analyzed to determine information regarding the call or message by examining the tone of the callers voice and the frequency of their speech. For example, if the voice information is rapid, loud, and high in tone, this may be indicative of a caller being stressed or angry. Accordingly, the call may be judged as urgent and specific actions may be taken, such as redirecting the call to a live person or marking the message as "urgent."

FIG. 1 provides a block diagram of a system 100 for connecting telephone users with the public switched telephone network (PSTN). As illustrated, system 100 may include an incoming line 102, a switch 104, a storage device 106, and a plurality of end user's telephones 108. The incoming line 102 may be a standard incoming telephone line, and the switch 104 may be a Private Branch Exchange (PBX). In one embodiment, the storage device 106 stores a list of phoneme representations of specified words or phrases. Each of these phoneme representations may be assigned a specific value. A phoneme is a member of the set of the smallest units of speech that serve to distinguish one utterance from another in a language or dialect. As discussed above, the specific words or phrases checked for may be user specified. As will be obvious to one of skill in the art, the storage device 106 may be included as part of the switch 104.

When a call originating across the PSTN arrives on the communication's line 102 at the switch 104, it is directed to one of the end user telephones 108. If the phone call is not answered, the caller may be directed to leave a voice message. The voice messaging software and hardware may be contained within the switch 104, or be a separate device connected to the switch 104.

Figure 2:
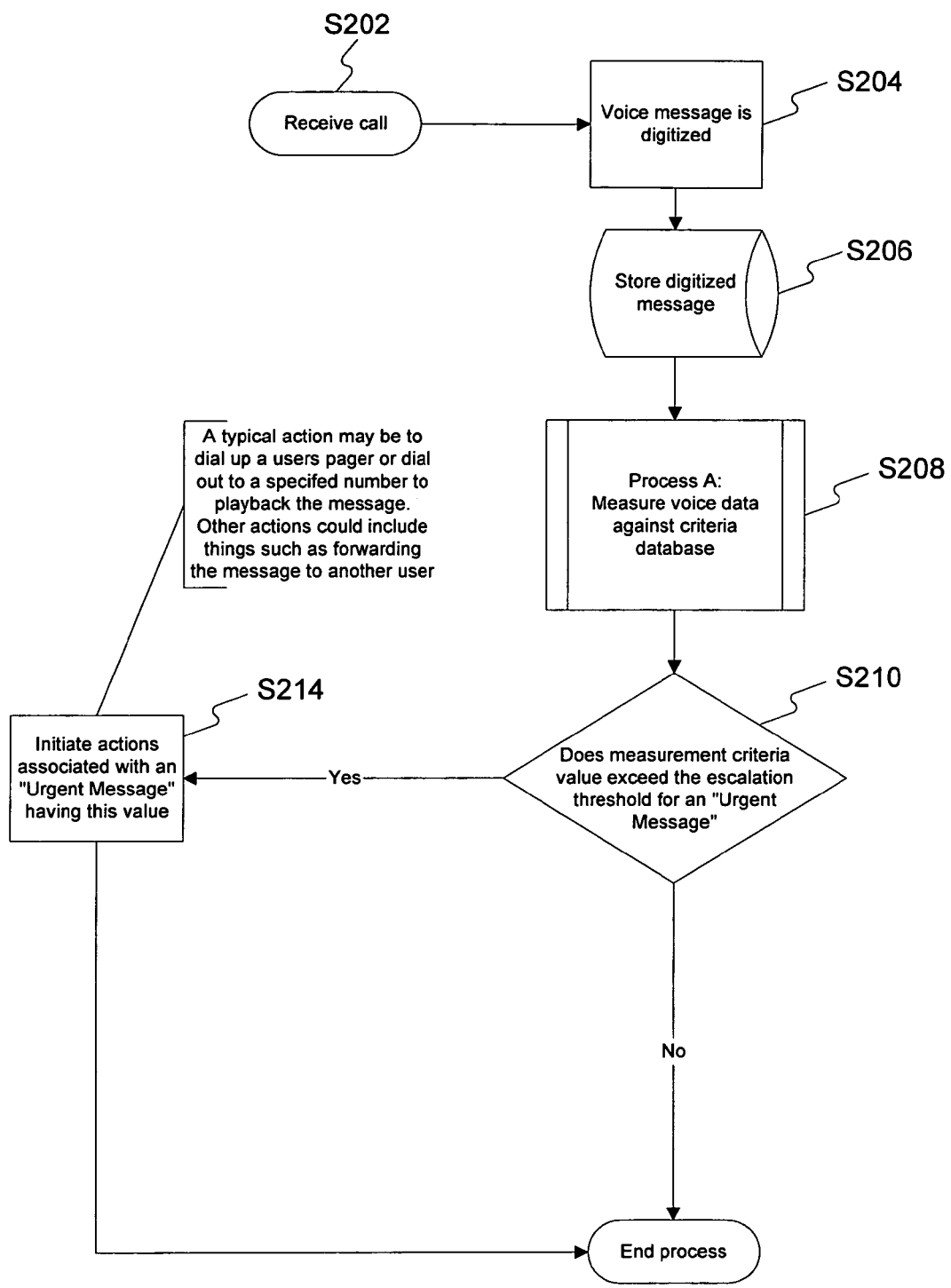
FIG. 2 provides a flow chart of a method for analyzing a voice message, in accordance with methods and systems consistent with the invention.

FIG. 2 provides a flow chart of a method for analyzing a voice message by matching words and or phrases and performing one or more actions in the event one or more of the words are found in the voice message, consistent with an embodiment of the invention. As illustrated, an analog voice message is received (S202), converted from analog to digital (S204) and then stored (S206). An analog to digital converter may be used for converting the voice message from analog to digital. In another embodiment, the voice information may be received in a digital format. As will be obvious to one of skill in the art, if the voice information is received in a digital format, there is no need to convert the voice from analog to digital. In other embodiments, the voice is received in an analog format and is left in its analog format. Accordingly, all processing in these embodiments is done using the analog voice information. Next, the procedure moves to the process illustrated in FIG. 3 (S208).

Figure 3:
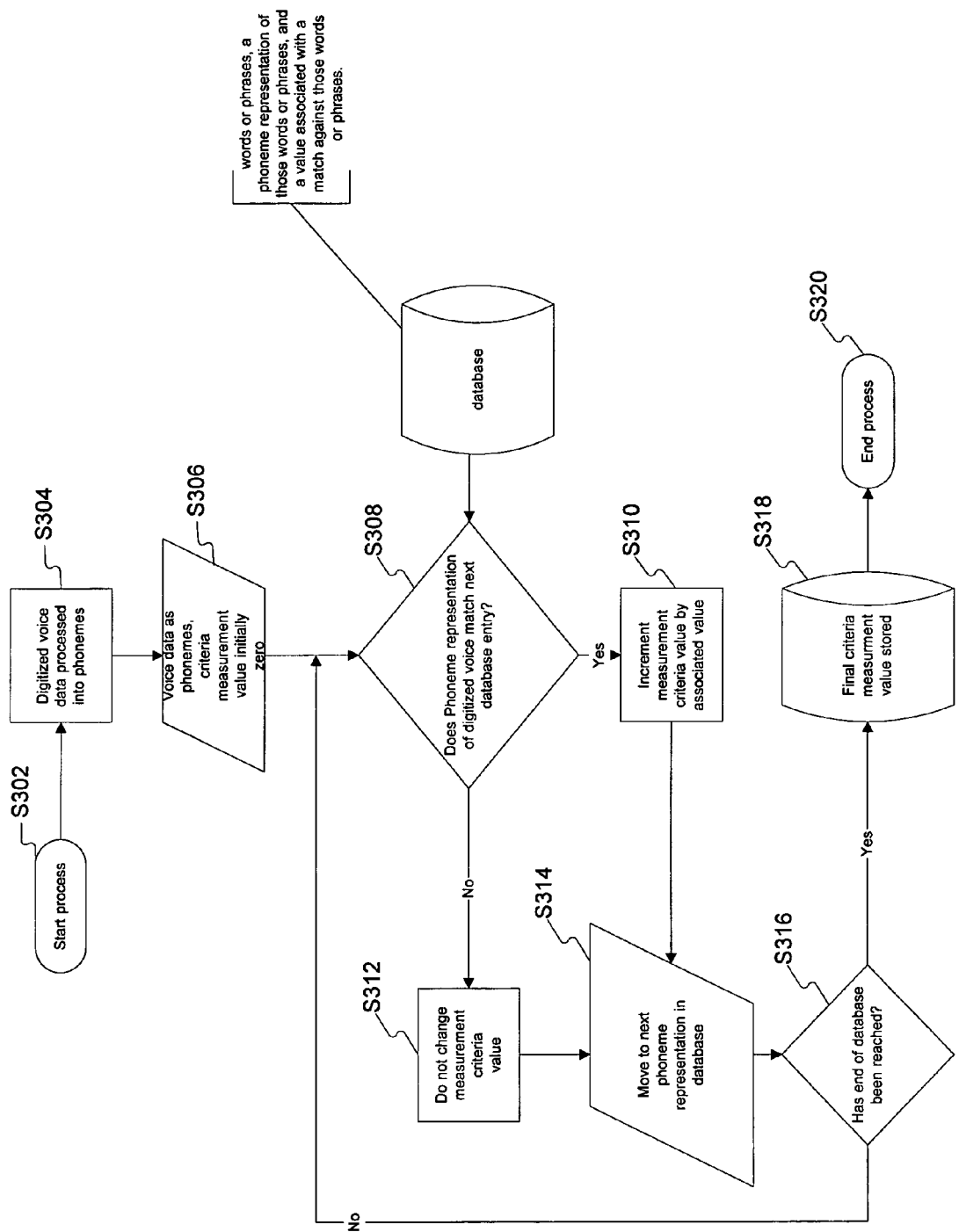
FIG. 3 provides a flow chart of a method for analyzing voice information for specific words or phrases, in accordance with methods and systems consistent with the invention.

FIG. 3 provides a flow chart of a method for analyzing voice information for specific words and/or phrases. The process is started by step S208 illustrated in FIG. 2 (S302). First, the digitized voice is processed into phonemes (S304). Next, a criteria measurement value is set to zero (S306). The collection of phonemes is then checked to see if a consecutive collection of them match a phoneme representation of a specified word or phrase stored in a database (S308). In this example, the words or phrases stored in the database are used to determine if a message should be marked as urgent, and may include words or phrases such as "Urgent," expletives, "Help," "Hurry," and "Where are you?". If the phoneme representation of the word or phrase is found in the voice message, the criteria measurement value is incremented by a value associated with the phoneme representation stored in the database (S310). Otherwise, it is not incremented (S312). The process then moves to the next phoneme representation stored in the database (S314). If the end of the list is reached (S316), the final criteria measurement value is stored (S318), and the process is ended (S320). Otherwise, steps 308 through 316 are repeated in order to check the voice message for the next word or phrase stored in the memory or database, and increment the criteria measurement value accordingly. This process is then repeated until all the words or phrases stored in the database are checked. After which, the process illustrated in FIG. 3 is terminated, and operation returns to the process illustrated in FIG. 2.

Referring back to FIG. 2, after the process illustrated in FIG. 3 is completed (S208), the resulting criteria measurement value is checked to determine if it exceeds a threshold value indicating that the message is "Urgent" (S210). This threshold value may be stored and retrieved from a memory or storage device. If the criteria measurement value exceeds the threshold value, the next step is to perform actions associated with a message having this specific criteria measurement value (S214). For example, these actions may include calling a user's pager number, calling a specific number and playing back the message when the call is answered, or forwarding the message to another user. Thus, for example, if the criteria measurement value lies within a specific range, one set of actions may be performed; if it lies within another range, another set of actions may be performed, and so on. As such, if the criteria measurement value marginally exceeds the threshold value, the message may be simply forwarded to voice mail and marked as "Urgent." If the criteria measurement value falls in a higher range of values, a person's pager number may be dialed. Further, if the criteria measurement value falls in yet a higher range, the message may be immediately redirected to another individual so that they may immediately handle the matter.

The hardware and software for performing the above described procedure may be contained in the switch 104, contained in a separate device connected to the switch 104, packaged along with the voice messaging hardware and software, or in some other combination. The hardware may include, for example, a processor, memory, and storage device. The processor in conjunction with the memory may perform the various procedures for analyzing the voice message. The storage device may store the words and phrases, their phoneme representations, their associated value, the actions, and the software for performing the analysis and actions. The memory may be, for example, Random Access Memory (RAM). The storage device may, for example, be a hard disk drive.

Further, multiple variables may be used, where each variable is used to determine different things. For example, one variable may be used to determine if a call is urgent, another may be used to determine if the caller is angry, and yet another variable may be used to determine if a person's name is used. Also, this information can be combined with information gathered from the phone call itself, such as caller ID information, in determining what, if any, action(s) should be taken.

Further, in another embodiment, rather than searching for specific words or phrases, the voice message is analyzed for speech frequency and tone in order to gain information regarding the message. For example, if a message is urgent, a caller may speak rapidly, be out of breath, or be speaking in a high pitch. Thus, the voice message may be analyzed looking for these characteristics. If these characteristics are found, a specific action could be triggered, such as forwarding the message to a person who could immediately handle the matter. For example, a caller to a doctor's office after hours may leave an urgent message and not use any of the specific words that are indicative of a call being urgent, however the caller may be speaking rapidly and be out of breath. Thus, by examining the caller's speech, the urgency of the call may be determined and the call forwarded to a person who could immediately handle the message. For example, the call may be forwarded to emergency personnel or to a doctor's home number. The message could then be listened to, and, if it is urgent, appropriate action could be taken, such as sending an ambulance.

Referring back to FIG. 1, in another embodiment, a caller in a call center may use one of the telephones 108 to place a call through the switch 104, and communications line 102, over the PSTN to an individual(s). In this embodiment, a status of the call may be monitored by analyzing the voice information received from the called individual(s). For example, as discussed above, the invention may be used in telemarketing in order to monitor the status of a sales call, so that a supervisor, or sales agent can monitor whether the phone call is going well or poorly and take appropriate action.

Figure 4:
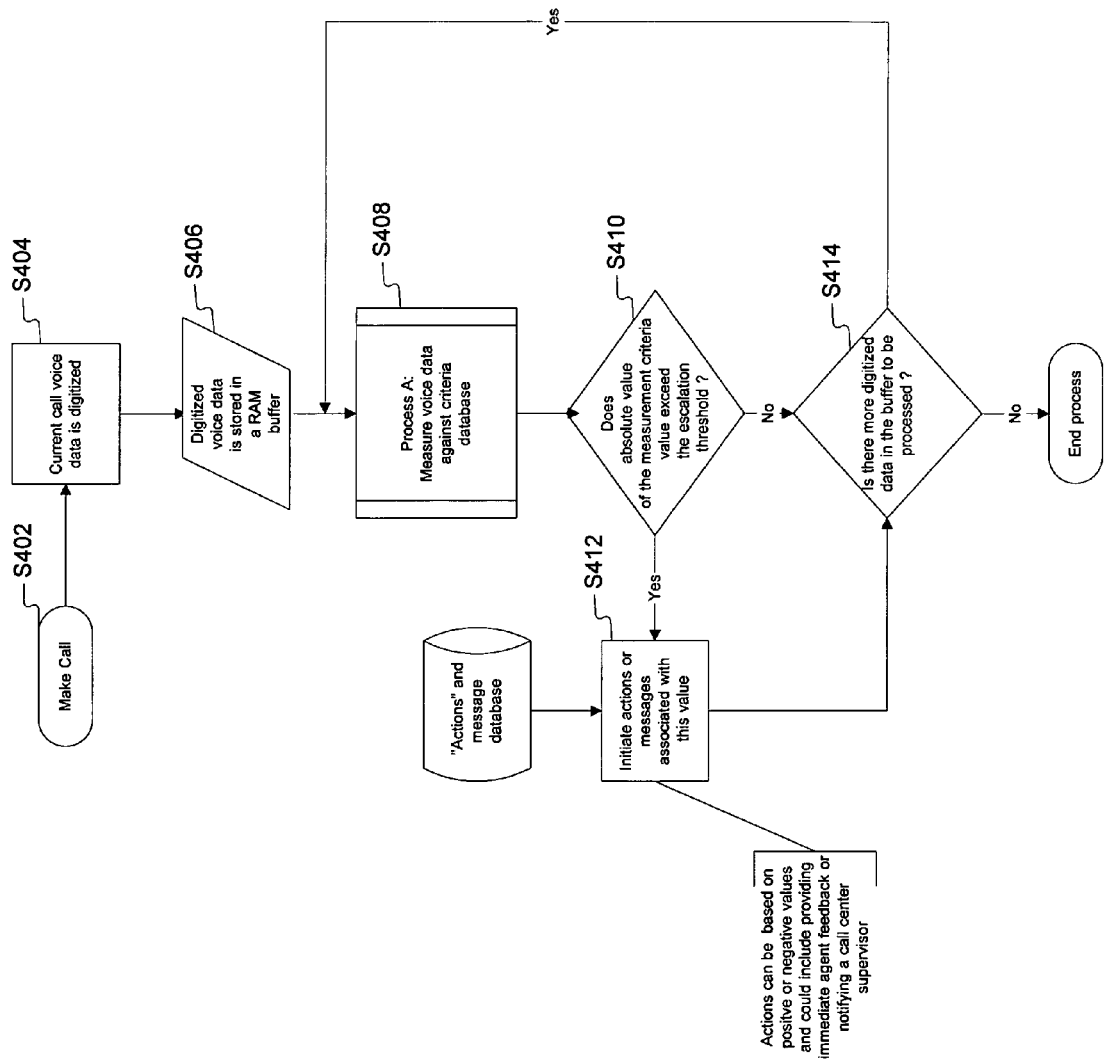
FIG. 4 provides a flow chart of a method for analyzing voice information in a call center, in accordance with methods and systems consistent with the invention.

FIG. 4 provides an example flow chart for this embodiment. In this example, the process begins when a call is made to a prospective customer (S402). When the prospective customer answers, voice data is sent from the prospective customer's telephone to the call center where it is converted from analog to digital format (S404). This conversion may be accomplished using an analog to digital converter. In another embodiment, the voice information may be received in a digital format. As will be obvious to one of skill in the art, if the voice information is received in a digital format, there is no need to convert the voice from analog to digital. Next, the digitized voice data is stored in a buffer (S406). This buffer can be any type of buffer, such as a Random Access Memory (RAM) buffer. Next, the process illustrated in FIG. 3 and discussed above is performed (S408).

First, the digitized voice is processed into phonemes (S304). Next, a criteria measurement value is set to zero (S306). The collection of phonemes stored in the buffer is then checked to see if a consecutive collection of them matches a phoneme representation of a specified word or phrase stored in a memory or database (S308). In this example, the words or phrases stored in the database are used to determine if the call is going poorly, and could include words or phrases such as "Come on", "Give me a break", or "Get real." If the phoneme representation of the word or phrase is found in the voice message, the criteria measurement value is incremented by a value associated with the phoneme representation stored in the memory or database (S310). Otherwise, it is not incremented (S312). In some cases, the value associated with a specific phoneme may be positive, while in other cases it may be a negative value. For example, the word "Wonderful" may be indicative of a call that is going well and thus has a positive value associated with it, while the word "Liar" may be indicative of a call going poorly and thus has a negative value associated with it.

The process then moves to the next phoneme representation stored in the memory or database (S314). If the end of the list is reached (S316), the final criteria measurement value is stored (S318), and the process is ended (S320). Otherwise, steps 308 through 316 are repeated in order to check the voice message for the next word or phrase stored in the memory or database, and increment the criteria measurement value accordingly. This process is then repeated until all the words or phrases stored in the memory or storage are checked. After which, the process illustrated in FIG. 3 is terminated, and operation returns to the process illustrated in FIG. 4.

Referring back to FIG. 4, the next step is determining whether an absolute value of a criteria measurement value returned by the process illustrated in FIG. 3 exceeds a threshold value (S410). This threshold value may be stored in and retrieved from a memory or other storage device. If the absolute value of the criteria measurement value exceeds the threshold value, a set of actions associated with this value may be performed. If the threshold value is exceeded, actions associated with this specific value are performed (S412). As in the process illustrated in FIG. 2 and discussed above, different actions may be performed depending upon the specific value of the criteria measurement value or a specific range that the criteria measurement value falls within. For example, if a value is positive, a green light may be turned on so that a supervisor knows that the call is going well. The supervisor may then monitor the call, and step in if they think they can close the sale. Further, a red light may be turned on if the value is negative so that the supervisor knows the call is going poorly. The actions associated with a specific criteria measurement value or range of values may be stored in a storage device, such as memory or a database. Next, the process determines whether there is more voice information to process (S414). For example, if the call is on-going the buffer will be constantly receiving new voice information. If there is still voice information to process, steps 408-414 are repeated. This process then continues until the call ends and there is no further voice information to process.

Further, information generated by monitoring the status of a call can be used to generate call center statistics. For example, the information can be used to determine the percentage of customers that are happy, the percentage that are uninterested, the percentage that become angry, and the percentage that are pleased. These statistics could then, for example, be used in modifying or creating a script that is more successful. For example, if a high percentage of prospective customers are determined to be reacting negatively or uninterested during a specific portion of the script, this portion could be modified.

Figure 5:
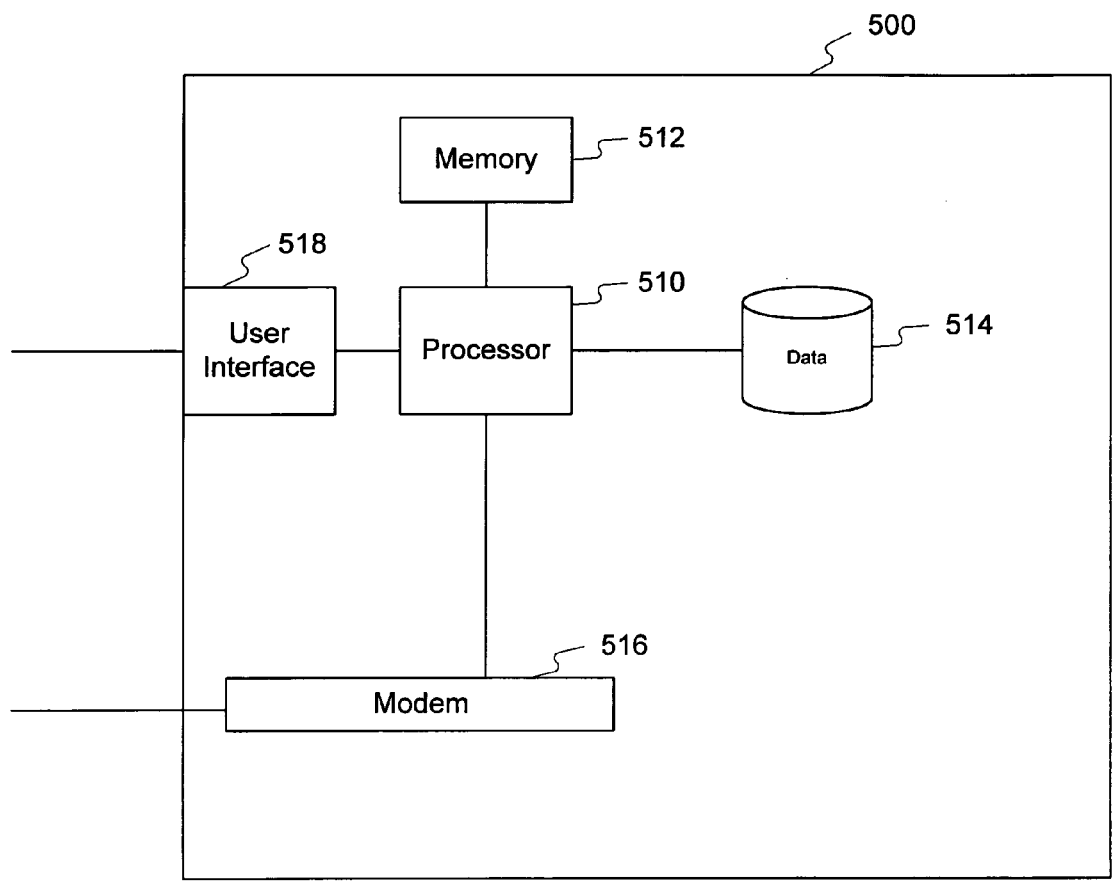
FIG. 5 illustrates a computer for analyzing voice information, in accordance with methods and systems consistent with the invention.

The hardware and software for performing the above described procedure illustrated in FIGS. 4 and 5 may be contained in the switch 104, contained in a separate device connected to the switch 104, or in some other combination. The hardware may include, for example, a processor, memory, and storage device. The processor in conjunction with the memory may perform the various procedures for analyzing the voice information. The storage device may store the words and phrases, their phoneme representations, their associated values, the actions, and the software for performing the analysis and actions. The memory may be, for example, Random Access Memory (RAM). The storage device may be, for example, a hard disk drive.

In another embodiment, rather than analyzing the voice information for specific words or phrases, the voice information is analyzed looking for particular speech characteristics, such as frequency and tone. As such, information regarding the prospective customer or called person may be gained by analyzing their speech for these characteristics. For example, a prospective customer's speech may be analyzed to determine if they are angry by analyzing their speech for characteristics indicative of a person being angry.

In another embodiment, software operating on a user's computer examines voice messages left for the user and performs specific action(s) if specific words or phrases appear in the message. The words or phrases checked for may be user specified. FIG. 5 illustrates a computer 500 for analyzing voice information. As illustrated, the computer 500 includes a processor 510, memory 512, a storage device 514, a modem 516, and a user interface 518, consistent with such an embodiment. The storage device 514 may be any type of storage device. For example, it may be a hard disk drive. The memory 512 can be any type of memory. For example, it may be Random Access Memory (RAM). The user interface 518 may be connected to a keyboard (not shown) or mouse (not shown) for receiving user information. Further, the computer may be connected to a display device (not shown) for displaying information to the user. The modem 516 may be an internal modem, an external modem, or a PC card that plugs into the computer. The modem 516 may be connected to a standard telephone line. In this embodiment, the modem serves multiple functions and may be equipped with digital signal processor that allows voice data to be converted to digital data for further processing.

In this example, the modem converts the voice it receives over the attached telephone line from analog to digital. The digitized voice information is then processed, looking for specific words or phrases that are stored in memory 512, the storage device 514 or a combination of the two. As discussed above, the specific words or phrases depend on the particulars of the specific implementation of the invention. For example, if the voice is being analyzed to determine if the person is angry, the words or phrases include words or phrases indicative of a person being angry, for example, expletives. Depending on the results of this analysis, a specific action or actions is/are undertaken. These actions depend on the specific implementation. For example, if the person wants to be paged in the event a message is angry, the word or phrases checked for would be words or phrases indicative of a caller being angry, and the action to take would be to dial the person's pager number. Further, as discussed above, the processor may analyze the voice information looking for particular patterns of speech.

The processing of the voice information may be performed by software running on the processor 510, a processor included with the modem 516, or a combination of the two. The computer's memory 512 and/or storage device 514 may store the software, word and phrases, and associated actions, or they may be stored in a memory and/or a storage device built into the modem 516 or other device, or a combination of memory and storage devices in both the modem 516 and computer 500. The words or phrases checked may be user specified and entered into the computer 500 through the user interface 518. The processor 510 in conjunction with any other appropriate hardware and/or software may perform the specified action(s). For example, the processor 510 in conjunction with a dialer may call a pager number.

Figure 6:
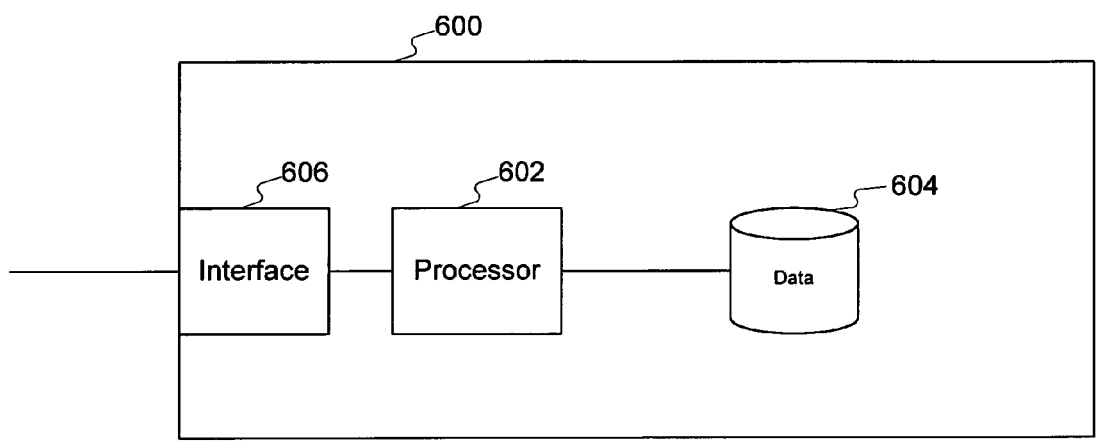
FIG. 6 illustrates a device for analyzing voice information that may be connected to a telephone, computer, or simply a telephone line, in accordance with methods and systems consistent with the invention.

FIG. 6 illustrates a device 600 that can be connected to a telephone, computer, or simply a telephone line. As shown, the device may include a processor 602, a memory/storage device 604, and an interface 606 for connecting to a computer, telephone, telephone line, or other device. In this example, software may be stored in the memory/storage device 604 that may be executed by the processor 602. The memory/storage device may be any type of memory or storage capable of storing the software. The software is executed by the processor. As with the examples discussed above, the device 600 examines voice information looking for specific words or phrases, or patterns of speech. Depending on the specific words or phrases uttered, the device takes a specific action that depends on the specific implementation. Also, user specified words or phrases may be entered by the user though a computer connected to the device 600 or though a user interface (not shown) that may be included with the device.

While it has been illustrated and described what is at present considered to be the preferred embodiment and methods of the present invention, it will be understood by those skilled in the art that various changes and modifications may be made, and equivalents may be substituted for elements thereof without departing from the true scope of the invention.

In addition, many modifications may be made to adapt a particular element, technique or, implementation to the teachings of the present invention without departing from the central scope of the invention. Therefore, it is intended that this invention not be limited to the particular embodiment and methods disclosed herein, but that the invention includes all embodiments falling within the scope of the appended claims.

What is claimed is:

1. A method for processing a voice message, comprising:
storing one or more voice representations, wherein each voice representation corresponds to a word or phrase and is associated with a value;
storing one or more actions;
receiving a voice message;
receiving a one of: a user-specified word and a user-specified phrase from a user, the received user-specified word or phrase corresponding to a word or phrase having a corresponding stored voice representation;
analyzing the voice message to determine if one or more of the stored voice representations corresponding to the received user-specified word or phrase occur in the voice message and to generate a final criteria measurement value associated with the voice message, the final criteria measurement value based on the value associated with each determined stored voice representation occurring in the voice message; and performing one or more of the stored actions based on the final criteria measurement value if one or more of the stored voice representations are found to occur in the voice message.

2. The method of claim 1, wherein each of the stored voice representations is a phoneme representation of a word or phrase.

3. The method of claim 2, wherein the received voice message is an analog voice message, the method further comprising:
    converting the analog voice message from analog to digital; and
    processing the digitized voice message into phonemes;
    wherein analyzing the voice message to determine if one or more of the stored voice representations are used includes comparing the phonemes from the voice message with one or more of the stored voice representations.

4. The method of claim 1, further comprising:
    the user specifying one or more actions, wherein the actions are to be performed in the event one or more of the voice representations are found in the voice message;
    storing the user specified one or more actions; and
    wherein in performing one or more of the stored actions, the stored actions include the user specified actions.

5. The method of claim 1, wherein the stored one or more actions include marking the message as urgent.

6. The method of claim 1, wherein the stored one or more actions include calling a pager.

7. The method of claim 1, wherein the stored one or more actions include forwarding the voice message.

8. The method of claim 1, wherein the voice message is received over a telephone line.

9. A method for analyzing voice information received from a person over a communications line, comprising:
    storing one or more voice representations, where each voice representation corresponds to a word or phrase and is associated with a value;
    storing one or more actions;
    receiving voice information from a person over a communications line;
    receiving a one of: a user-specified word and a user-specified phrase from a user, the received user-specified word or phrase corresponding to a word or phrase having a corresponding stored voice representation;
    analyzing the voice information from the person to determine if one or more of the stored voice representations corresponding to the received user-specified word or phrase occur in the voice information received from the person and to generate a final criteria measurement value associated with the voice information, the final criteria measurement value based on the value associated with each determined stored voice representation occurring in the voice information; and
    performing one or more of the stored actions based on the final criteria measurement value if the voice information is found to include one or more of the stored voice representations.

10. The method of claim 9, wherein each of the stored voice representations is a phoneme representation of a word or phrase.

11. The method of claim 10, wherein the received voice information is analog voice information, the method further comprising:
    converting the analog voice information from analog to digital; and
    processing the digitized voice information in phonemes;
    wherein analyzing the voice information to determine if one or more of the stored voice representations are used includes comparing the phonemes from the voice information with one or more of the stored voice representations.

12. The method of claim 9, further comprising:
    the user specifying one or more actions, wherein the actions are to be performed in the event one or more of the stored voice representations are found in the voice information;
    storing the user specified actions; and
    wherein in performing one or more of the stored actions, the stored actions include the user specified actions.

13. The method of claim 9, wherein:
    receiving voice information comprises receiving voice information during a call; and
    the one or more actions include compiling statistics on the call.

14. The method of claim 9, wherein the communications line is a telephone line.

15. An apparatus for processing a voice message, comprising:
    a storage device for storing one or more voice representations where each voice representation corresponds to a word or phrase and is associated with a criteria measurement value, and for storing one or more actions;
    an interface for receiving from a user a one of: a user-specified word and a user-specified phrase; and
    a processor for receiving a voice message, analyzing the voice message to determine if one or more of the stored voice representations corresponding to the received user-specified word or phrase occur in the voice message and to generate a final criteria measurement value associated with the voice message, and performing one or more of the stored actions based on the final criteria measurement value if one or more of the stored voice representations are found to occur in the voice message, the final criteria measurement value based on the value associated with each determined stored voice representation occurring in the voice message.

16. The apparatus of claim 15, wherein each of the voice representations is a phoneme representation of a word or phrase.

17. The apparatus of claim 16, further comprising:
    an analog to digital converter for converting an analog voice message from analog to digital; and
    wherein the processor is further for processing the digitized voice message into phonemes and comparing the phonemes from the voice message with one or more of the stored voice representations.

18. The apparatus of claim 15, further comprising:
    a user interface for receiving user specified actions, wherein the actions are to be performed in the event one or more of the stored voice representations are found in the voice message; and
    wherein the storage device is further for storing the user specified actions.

19. The apparatus of claim 15, wherein the apparatus is connected to a telephone line, and the processor is capable of receiving the voice message over the telephone line.

20. An apparatus for analyzing voice information received from a person over a communications line, comprising:
    a storage device for storing one or more voice representations, where each voice representation corresponds to a word or phrase and is associated with a value, and for storing one or more actions;

an interface for receiving a one of: a user-specified word and a user-specified phrase; and a processor for receiving voice information from a person over a communications line, analyzing the voice information to determine if one or more of the stored voice representations corresponding to the received user-specified word or phrase occur in the voice information received from the person and to generate a final criteria measurement value associated with the voice information, and performing one or more of the stored actions based on the final criteria measurement value if the voice information is found to include one or more of the stored voice representations, the final criteria measurement value based on the value associated with each determined stored voice representation occurring in the voice information.

21. The apparatus of claim 20, wherein each of the voice representations is a phoneme representation of a word or phrase.

22. The apparatus of claim 21, wherein the received voice information is analog voice information, further comprising:

an analog to digital converter for converting the analog voice information from analog to digital; and wherein the processor is further for processing the digitized voice information into phonemes and comparing the phonemes from the voice information with one or more of the stored voice representations.

23. The apparatus of claim 20, further comprising:

a user interface for receiving information regarding user specified actions, wherein the actions are to be performed in the event one or more of the voice representations are found in the voice information; and wherein the storage device is further for storing the user specified actions.

24. The apparatus of claim 20, wherein:

the voice information is received during a call; and the one or more actions include compiling statistics on the call.

25. The apparatus of claim 20, wherein the processor is capable of receiving the voice information over a telephone line.

26. An apparatus for processing a voice message, comprising:

means for storing one or more voice representations, wherein each voice representation corresponds to a word or phrase and is associated with a value, and for storing one or more actions;

means for receiving a voice message;

means for receiving a one of: a user-specified word and a user-specified phrase from a user, the received user-specified word or phrase corresponding to a word or phrase having a corresponding stored voice representation; and means for analyzing the voice message to determine if one or more of the stored voice representations corresponding to the received user-specified word or phrase occur in the voice message and to generate a final criteria measurement value associated with the voice message, and performing one or more of the stored actions based on the final criteria measurement value, if one or more of the stored voice representations are found to occur in the voice message, the final criteria measurement value based on the value associated with each determined stored voice representation occurring in the voice message.

27. An apparatus for analyzing voice information received from a person over a communications line, comprising:

means for storing one or more voice representations, where each voice representation corresponds to a word or phrase and is associated with a value, and for storing one or more actions;

means for receiving voice information from a person over a communications line;

means for receiving a one of: a user-specified word and a user-specified phrase from a user, the received user-specified word or phrase corresponding to a word or phrase having a corresponding stored voice representation; and means for analyzing the voice information from the person to determine if one or more of the stored voice representations corresponding to the received user-specified word or phrase occur in the voice information received from the person and to generate a final criteria measurement value associated with the voice information, and performing one or more of the stored actions based on the final criteria measurement value if the voice information is found to include one or more of the voice representations, the final criteria measurement value based on the value associated with each determined stored voice representation occurring in the voice information.

28. A non-transitory computer readable medium whose contents cause a computer to perform a procedure for processing a voice message comprising:

receiving a voice message;

receiving a one of: a user-specified word and a user-specified phrase from a user, the received user-specified word or phrase corresponding to a word or phrase having a corresponding stored voice representation;

analyzing to voice message to determine if one or more stored voice representations corresponding to the received user-specified word or phrase occur in the voice message, wherein each voice representation corresponds to a word or phrase and is associated with a value, wherein analyzing the voice message comprises generating a final criteria measurement value associated with the voice message; and performing one or more stored actions based on the final criteria measurement value if one or more of the stored voice representations are determined to occur in the voice message.

29. A non-transitory computer readable medium whose contents cause a computer to perform a procedure for processing voice information comprising:

receiving voice information from a person over a communications line;

receiving a one of: a user-specified word and a user-specified phrase from a user, the received user-specified word or phrase corresponding to a word or phrase having a corresponding stored voice representation;

analyzing the voice information from the person to determine if one or more stored voice representations corresponding to the received user-specified word or phrase occur in the voice information, wherein each voice representation corresponds to a word or phrase and is associated with a value, wherein analyzing the voice information comprises generating a final criteria measurement value associated with the voice information; and performing one or more stored actions based on the final criteria measurement value if one or more of the stored voice representations are determined to occur in the voice information.

* * * * *